United States Patent Office 2,781,387
Patented Feb. 12, 1957

2,781,387
4-METHYL-7-CYCLOHEXYLIDENE-3-HEPTENYL METHYL KETONE AND INTERMEDIATES

Joseph Donald Surmatis, Pompton Plains, N. J., assignor to Hoffmann-La Roche Inc., Nutley, N. J., a corporation of New Jersey No Drawing. Application June 10, 1955,
Serial No. 514,747

3 Claims. (Cl. 260—410.9)

This invention relates to novel chemical compounds and to processes for their preparation. More particularly, it relates to 4-methyl-7-cyclohexylidene-3-heptenyl methyl ketone and to novel processes and novel chemical intermediates having utility to prepare this compound.

4-methyl-7-cyclohexylidene-3-heptenyl methyl ketone is useful as an odor-imparting agent, for example in the preparation of perfumes and of scented compositions generally. It has a fragrance reminiscent of roses and of eau de vie de pomme, with a "woodsy," fruity note. It can be used, for example, as an ingredient of synthetic Roses d'Orient perfumes, and of chypre type perfumes, and of synthetic compositions simulating fruit aromas.

One comprehensive embodiment of the invention relates to a process of making 4-methyl-7-cyclohexylidene-3-heptenyl methyl ketone which comprises the steps of halogenating 3-cyclohexylidenepropyl vinyl methyl carbinol to produce 3-methyl-6-cyclohexylidene-2-hexenyl halide, reacting the latter with a lower alkyl acetoacetate to produce 1-lower carbalkoxy-4-methyl-7-cyclohexylidene-3-heptenyl methyl ketone and subjecting the latter to ketonic scission.

The comprehensive embodiment referred to above can be visualized in terms of the following flow sheet:

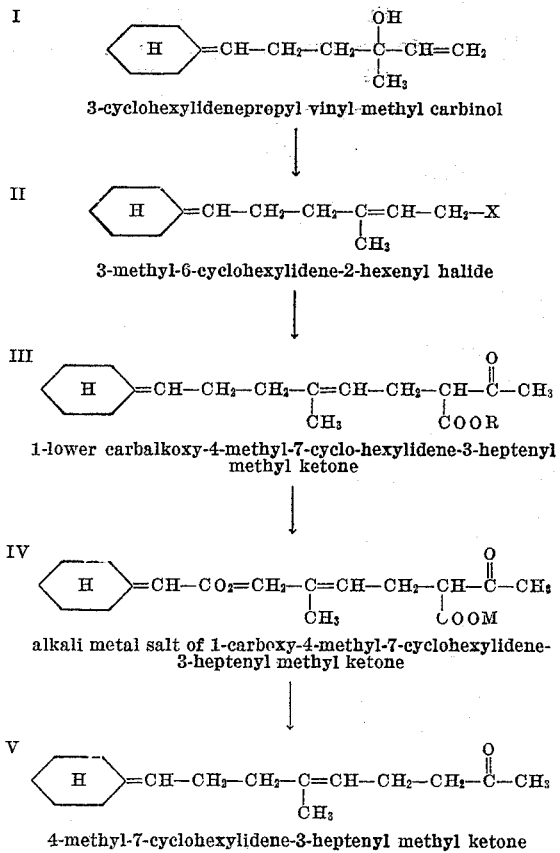

FLOW SHEET

I  3-cyclohexylidenepropyl vinyl methyl carbinol

II  3-methyl-6-cyclohexylidene-2-hexenyl halide

III  1-lower carbalkoxy-4-methyl-7-cyclo-hexylidene-3-heptenyl methyl ketone

IV  alkali metal salt of 1-carboxy-4-methyl-7-cyclohexylidene-3-heptenyl methyl ketone V  4-methyl-7-cyclohexylidene-3-heptenyl methyl ketone In the above formulas:

$X$ = a halogen, especially Cl or Br
$R$ = lower alkyl, especially methyl or ethyl
$M$ = alkali metal, especially Na or K It will be apparent from the foregoing formulas that an alternative nomenclature for 4-methyl-7-cyclohexylidene-3-heptenyl methyl ketone is 9-cyclohexylidene-6-methyl-5-nonen-2-one.

The first step in the novel synthesis of the instant invention can be effected by reacting 3-cyclohexylidenepropyl vinyl methyl carbinol with a halogenating agent appropriate to convert the former to its hydrohalic acid ester, e. g. phosphorus tribromide, dry hydrogen chloride, and the like. It is preferred to effect the halogenation by reacting 3-cyclohexylidenepropyl vinyl methyl carbinol with a concentrated aqueous solution of hydrochloric acid or of hydrobromic acid, especially with commercial concentrated aqueous hydrochloric acid of approximately 37% by weight HCl concentration, or commercial concentrated aqueous hydrobromic acid of approximately 48% by weight HBr concentration, at a temperature between about 0° C. and about room temperature.

The next step in the novel synthesis can be effected by reacting the 3-methyl-6-cyclohexylidene-2-hexenyl halide, obtained in the first step, with a lower alkyl acetoacetate, e. g. ethyl acetoacetate or methyl acetoacetate, in the presence of an alkaline condensation agent, e. g. an alkali metal such as sodium or potassium, or an alkali metal lower alkoxide such as sodium methoxide or potassium ethoxide. In this second step it is permissible to work with a crude 3-methyl-6-cyclohexylidene-2-hexenyl halide as produced by the preferred method of operating the first step, without special purification of said 3-methyl-6-cyclohexylidene-2-hexenyl halide.

The final steps of the novel synthesis comprise subjecting the 1-lower carbalkoxy-4-methyl-7-cyclohexylidene-3-heptenyl methyl ketone produced by the second step (which compound also need not be further purified) to ketonic scission. This can be accomplished, for example, by saponifying the 1-lower carbalkoxy-4-methyl-7-cyclohexylidene-3-heptenyl methyl ketone with an alkali metal hydroxide, and then acidifying the resulting alkali metal salt of 1-carboxy-4-methyl-7-cyclohexylidene-3-heptenyl methyl ketone, and heating to complete the decarboxylation thereby producing 4-methyl-7-cyclohexylidene-3-heptenyl methyl ketone.

The starting material of the above described synthesis, 3-cyclohexylidenepropyl vinyl methyl carbinol, is itself a novel compound. Although this compound is not claimed herein, the preparation thereof is described below:

*Preparation of 3-cyclohexylidenepropyl vinyl methyl carbinol*

445 g. of 1-vinyl-cyclohexanol was stirred for one hour with 1500 cc. of concentrated (37%) aqueous hydrochloric acid. The oil was separated, washed twice with water, and dried over calcium chloride. The 2-cyclohexylideneethyl chloride obtained had $n_D^{25} = 1.4994$.

In a five-liter flask, there was placed 390 g. of ethyl acetoacetate, 157 g. of sodium methylate and two liters of benzene. 414 g. of 2-cyclohexylideneethyl chloride was added at 40° C. in 30 minutes while stirring vigorously. The reaction mixture was stirred for three hours at 60–70° C., then for two hours at reflux temperature. After cooling, the reaction mixture was washed twice, each time with two liters of water. The benzene was distilled off under vacuum. The residual light brown colored syrup was dissolved in two liters of ethyl alcohol. This was placed in a flask together with 200 g. of potassium hydroxide and 500 cc. of water. The saponification was accomplished by stirring at 40–50° C. for four hours. Concentrated hydrochloric acid was dropped in from a separatory funnel, at such a rate that evolution of carbon dioxide did not cause foaming, until the mixture became strongly acid. The oil layer was removed. The aqueous layer was diluted with two liters of water and extracted with 500 cc. of benzene. The benzene extract and the oil layer were combined, washed neutral and dried over calcium chloride. On fractionation, there was obtained 3-cyclohexylidenepropyl methyl ketone, distilling at 103° C./6 mm., $n_D^{25}$=1.4760.

26 g. of metallic sodium was dissolved in one liter of liquid ammonia. Acetylene was bubbled into the solution, while stirring, until the color of the solution changed from deep blue to white. 159 g. of 3-cyclohexylidenepropyl methyl ketone dissolved in 200 cc. of diethyl ether was dropped into the stirred reaction mixture in one hour. Stirring was continued for three more hours while a slow stream of acetylene was bubbled in. The acetylene addition was stopped and the stirring was continued for 15 hours longer. The ammonia was then distilled off and the residue was washed with 2 liters of 5% aqueous sulfuric acid. The product was water washed, and dried over calcium sulfate. Upon fractionation, there was obtained 3-cyclohexylidenepropyl ethinyl methyl carbinol, distilling at 75° C./0.2 mm., $n_D^{25}$=1.490.

117 g. (0.6 mol) of 3-cyclohexylidenepropyl ethinyl methyl carbinol, 20 g. of 5% lead-palladium-calcium carbonate catalyst [Lindlar, Helvetica Chimica Acta 35, 446 (1952)] and 100 cc. of petroleum ether were placed in a flask equipped with an efficient stirrer. The material was hydrogenated at one atmosphere hydrogen pressure and 25–30° C. until hydrogen uptake ceased. There was required 0.6 mol of hydrogen. The catalyst was filtered off, and the product was fractionated. There was obtained 3-cyclohexylidenepropyl vinyl methyl carbinol distilling at 73° C./0.2 mm., $n_D^{25}$=1.489.

The invention is further disclosed in the following examples, which are illustrative but not limitative thereof, the invention being limited only by the appended claims:

EXAMPLE 1

56 g. of 3-cyclohexylidenepropyl vinyl methyl carbinol was stirred for one hour with 150 cc. of concentrated aqueous hydrochloric acid (37% by weight HCl) at 25° C. The oil layer was separated, washed twice with water, and dried over calcium sulfate. The dried liquid, 3-methyl-6-cyclohexylidene-2-hexenyl chloride, had $$n_D^{25}=1.487$$

EXAMPLE 2

In a two-liter flask were placed 500 cc. of benzene, 52 g. of ethyl acetoacetate, and 16.2 f. of sodium methoxide. After stirring for 30 minutes, 55 g. of the product of Example 1, 3-methyl-6-cyclohexylidene-2-hexenyl chloride, was dropped in from a separatory funnel in 30 minutes. The reaction mixture was stirred at 60° to 70° C. for four hours. After cooling to room temperature, the mixture was washed with 500 cc. of water and the benzene was stripped off under vacuum. The residual straw-colored oil consisted essentially of 1-ethoxy-4-methyl-7-cyclohexylidene-3-heptenyl methyl ketone.

EXAMPLE 3

200 cc. of ethanol, 35 g. of potassium hydroxide, and 50 cc. of water were added to the flask containing the entire quantity of 1-ethoxy-4-methyl-7-cyclohexylidene-3-heptenyl methyl ketone produced in Example 2 above. The saponification was effected by stirring the mixture at 40° to 50° C. for four hours. The decarboxylation of the resulting potassium salt of 1-carboxy-4-methyl-7-cyclohexylidene-3-heptenyl methyl ketone was accomplished by adding concentrated aqueous hydrochloric acid to the stirred reaction mixture until strongly acid. Stirring was then continued at 40° to 50° C. for two hours. The solution was cooled and diluted with 200 cc. of water. The oil layer was separated, and the aqueous portion was extracted with 200 cc. of petroleum ether. After water washing the combined oils until neutral and removing the solvent, the product was fractionated in vacuo. 4-methyl-7-cyclohexylidene-3-heptenyl methyl ketone distilled at 114° C. at 0.4 mm., $n_D^{25}$=1.4886.

I claim:
1. 3-methyl-6-cyclohexylidene-2-hexenyl halide.
2. 1-lower carbalkoxy-4-methyl-7-cyclohexylidene-3-heptenyl methyl ketone.
3. 4-methyl-7-cyclohexylidene-3-heptenyl methyl ketone.

References Cited in the file of this patent

UNITED STATES PATENTS

| | | |
|---|---|---|
| 2,176,055 | Britton et al. | Oct. 17, 1939 |
| 2,529,482 | Businger | Nov. 14, 1950 |

OTHER REFERENCES

Richter: "Textbook of Organic Chemistry," pp. 368–9, J. Wiley, 1952.